United States Patent
Verma et al.

(10) Patent No.: US 10,488,088 B2
(45) Date of Patent: Nov. 26, 2019

(54) DRAIN VALVE AND VALVE ARRANGEMENT

(71) Applicant: Danfoss A/S, Nordborg (DK)

(72) Inventors: Giriraj Verma, Gwalior (IN);
Rajendren Gurumoorthy, Rajakilpakkam (IN); Shrikant Chandrakant Kulkarni, Kancheepuram (IN); Niels P. Vestergaard, Horsens (DK)

(73) Assignee: DANFOSS A/S, Nordborg (DK)

( * ) Notice: Subject to any disclaimer, the term of this patent is extended or adjusted under 35 U.S.C. 154(b) by 56 days.

(21) Appl. No.: 15/669,093

(22) Filed: Aug. 4, 2017

(65) Prior Publication Data

US 2018/0266740 A1  Sep. 20, 2018

(30) Foreign Application Priority Data

Mar. 14, 2017  (IN) .............................. 201711008793
Apr. 12, 2017  (EP) .................................... 17166175

(51) Int. Cl.
*F25D 21/06*   (2006.01)
*F25B 41/04*   (2006.01)
(Continued)

(52) U.S. Cl.
CPC .............. *F25B 41/04* (2013.01); *B01D 5/006* (2013.01); *B01D 19/0063* (2013.01);
(Continued)

(58) Field of Classification Search
CPC .......... F25B 41/04; F25B 49/02; F25B 47/02; F25B 2500/01; F25B 2400/23;
(Continued)

(56) References Cited

U.S. PATENT DOCUMENTS 395,185 A   12/1888  Simpson
1,348,088 A   7/1920  Connell
(Continued)

FOREIGN PATENT DOCUMENTS

CN   202493756 U   10/2012
GB      265797 A    2/1927
(Continued)

OTHER PUBLICATIONS

Mikhailov et al., "Hot Gas Defrost of Low Temperature Refrigeration Evaporators with Natural Refrigerants", p. 1-5, (Dec. 31, 2012).
(Continued)

*Primary Examiner* — Ian G Paquette
(74) *Attorney, Agent, or Firm* — McCormick, Paulding & Huber LLP

(57) ABSTRACT

A valve arrangement according to the present disclosure includes a valve module and a drain valve. The valve module includes first and second functional spaces, and an attachment interface defining a passage into one of the first or second functional spaces. The drain valve includes a fluid inlet and a fluid outlet formed through a common connector part that is connectable to the attachment interface to connect the fluid inlet of the drain valve to the second functional space and the at least one fluid outlet to the first functional space.

19 Claims, 11 Drawing Sheets

(51) Int. Cl.
    F16K 31/26    (2006.01)
    B01D 19/00    (2006.01)
    F25B 47/02    (2006.01)
    F16T 1/24     (2006.01)
    F25B 49/02    (2006.01)
    F16T 1/45     (2006.01)
    B01D 5/00     (2006.01)
    F16K 31/30    (2006.01)
    F16K 5/04     (2006.01)

(52) U.S. Cl.
    CPC .......... *F16K 5/0442* (2013.01); *F16K 31/265* (2013.01); *F16K 31/30* (2013.01); *F16T 1/24* (2013.01); *F16T 1/45* (2013.01); *F25B 47/02* (2013.01); *F25B 49/02* (2013.01); *F25D 21/06* (2013.01); *F25B 2400/23* (2013.01); *F25B 2500/01* (2013.01)

(58) Field of Classification Search
    CPC ....... B01D 5/006; B01D 19/0063; F16T 1/20; F16T 1/22; F16T 1/24; F16T 1/383; F16T 1/386; F16T 1/42; F16T 1/45; F16T 1/48; F25D 21/06; F16K 24/048; F16K 31/22; F16K 31/24; F16K 31/26; F16K 31/265; F16K 33/00
    See application file for complete search history.

(56) References Cited

U.S. PATENT DOCUMENTS

| | | | |
|---|---|---|---|
| 1,426,205 A | | 8/1922 | Löffler |
| 4,757,837 A | * | 7/1988 | Provost .................. F16K 31/26 137/192 |
| 8,230,872 B2 | * | 7/2012 | Pandurang ................ F16T 1/24 137/184 |
| 2003/0074981 A1 | * | 4/2003 | Rebik ...................... F16K 31/26 73/861.57 |
| 2006/0272705 A1 | * | 12/2006 | Sugawara ............... F16K 31/24 137/192 |
| 2007/0277882 A1 | * | 12/2007 | Oshima ................... F16K 31/22 137/397 |
| 2008/0226470 A1 | * | 9/2008 | Yumoto ................ F16K 31/265 417/133 |
| 2015/0267818 A1 | * | 9/2015 | Rahman .................... F16K 1/54 137/862 |

FOREIGN PATENT DOCUMENTS

| | | |
|---|---|---|
| JP | 2001099396 A | 4/2001 |
| JP | 2010078224 A | 4/2010 |

OTHER PUBLICATIONS

Strong, "Hot Gas Defrost for Industrial Refrigeration", Heating, Piping and Air Conditioning, Reinhold Publishing Co. Inc. Stamford, US, vol. 60, No. 7, p. 71-74, 79-83. (Jul. 1, 1988).

Hansen Technologies Corporation, "HT Series & HD101 Refrigerant Float Drain Regulators", Bulletin D409a, p. 1-16, (Jan. 2004).

Danfoss, "Float Valve Type HFI", Data Sheet, p. 1-12, (Jan. 2017).

Danfoss, "Float Valves Types SV 1 and SV 3", Data Sheet, p. 1-8, (Jan. 2017).

Danfoss, "Float Valves Types SV 4, SV 5 and SV 6", Data Sheet, p. 1-10, (Oct. 2015).

Danfoss, "Valve Station ICF 15, ICF 20, ICF 25, ICF 50 and ICF 65", Data Sheet, p. 1-48, (Jan. 2017).

* cited by examiner

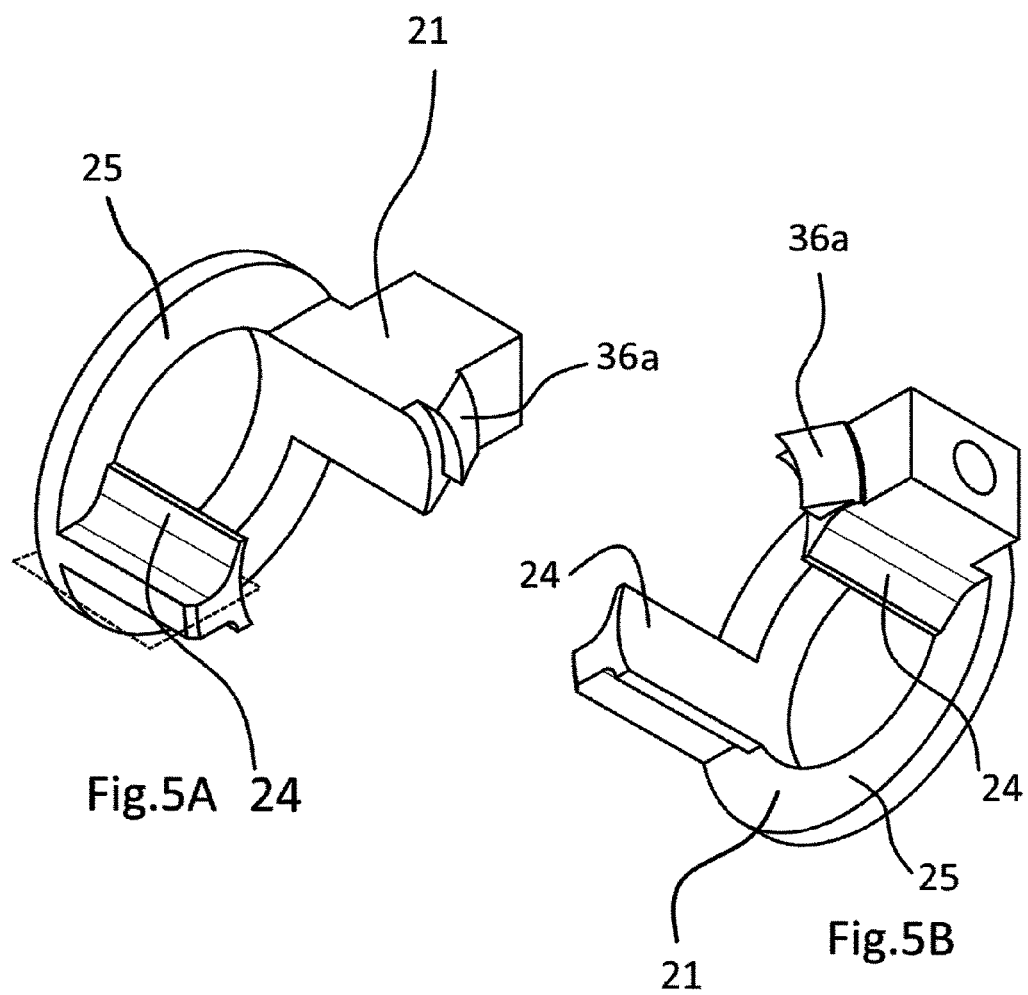

DRAIN VALVE AND VALVE ARRANGEMENT

CROSS REFERENCE TO RELATED APPLICATIONS

This application claims foreign priority benefits under U.S.C. § 119 to Indian Patent Application No. 201711008793 filed on Mar. 14, 2017 and European Application No. 17166175.4, filed on Apr. 12, 2017, the contents of which are hereby incorporated by reference in their entirety.

TECHNICAL FIELD

This invention relates to a valve arrangement and, more particularly, to a valve arrangement including a valve module and a drain valve.

BACKGROUND

Drain valves are, for example, used in refrigeration systems having a defrost function. When an evaporator of a refrigeration system works below 0° C. for a prolonged period of time water vapor from the ambient air can condense on the evaporator and form an ice layer on the evaporator. Ice is a relatively good heat insulator and therefore if the ice layer is allowed to build up it will reduce the efficiency of the refrigeration system more and more over time.

Consequently, a system for defrosting the evaporator is provided in many refrigeration systems. A typical way to defrost the evaporators is to divert hot gaseous refrigerant normally intended for the condenser into the evaporator to increase the temperature and remove any ice that may have accumulated on the evaporator. At the same time most of the liquid refrigerant in the evaporator is also pushed out by the hot gas. Since a mixture of liquid and gaseous refrigerant then exits the evaporator some of the hot gas may be fed back into the low pressure side of the circuit whereby the efficiency of the refrigeration system during a defrosting operation is reduced. In order to avoid such a reduction in efficiency it is known to provide a drain valve of the kind mentioned at the outset to ensure that the amount of hot gas that is fed back into the circuit is lowered. The drain valve prevents the passing of hot gas into the low pressure side of the refrigeration system during the defrost cycle. The flow rate of the liquid refrigerant is controlled in such a drain valve by a float connected to a lever which controls the opening and closing of a liquid outlet orifice through which the liquid refrigerant can exit the drain valve. When the level of liquid inside a float chamber of the drain valve rises the float connected to the lever also rises due to its buoyancy whereby the closing member opens the liquid outlet orifice and allows a larger amount of liquid to exit the drain valve. This allows to control the flow speed of the refrigerant coming from the evaporator back into the low pressure side of the refrigeration system.

However, in order to produce a sufficiently large force to displace the closing element and open the liquid outlet orifice the float and the float chamber need to have a relatively large size. In particular, opening the liquid outlet orifice will create a negative pressure close to the liquid outlet orifice as compared to the rest of the float chamber. This results in a net pressure force on the closing element that counteracts the force provided by the float. Consequently, if the pressure of the refrigerant in the drain valve is relatively high compared to the low pressure side of the refrigeration system and these pressure forces can become comparable to the force provided by the float. This consequently limits the functionality of the drain valve. The known solution to this problem is to increase the size of the float and the float chamber as well as the length of the lever to ensure that the drain valve will function properly even in higher pressure applications. However, this solution is undesirable since it increases both the overall size and costs of the drain valve.

SUMMARY

According to the present disclosure, the present invention relates to a drain valve comprising a housing, a fluid inlet, a gas outlet, at least one liquid outlet orifice arranged in a liquid outlet member of the housing, a float and a lever connected at a first end to the float, wherein the float is arranged in a float chamber of the housing, and wherein the float chamber is connected to the fluid inlet, the gas outlet and the at least one liquid outlet orifice, and wherein the liquid outlet orifice may be opened or closed by a closing member that is connected to a second end of the lever and is rotatably connected to the liquid outlet member, wherein if a liquid is arranged in the float chamber a rise in the liquid level will result in a lift of the float, whereby the closing member is rotated to a more open position of the at least one liquid outlet orifice and vice versa. The invention furthermore relates to a valve arrangement comprising a valve module and a drain valve of the above kind.

A task of the present invention is to provide a drain valve that can be operated at higher fluid pressures without increasing the size of the valve.

According to the present invention the above task is solved in a drain valve as mentioned in the outset in that the liquid outlet member comprises a cylinder-like section and the closing member is arranged concentrically around the cylinder-like section. The liquid outlet member can then be connected to the housing at least at one end of the liquid outlet member. Thereby, fluid flowing through the at least one liquid outlet orifice into the cylinder-like section can then flow towards a liquid outlet arranged in the housing. This solution allows to reduce the size of the closing member and thus reduce the surface for pressure forces to act on the closing member.

In embodiments, the closing member comprises a closing element, wherein in the open valve position of the closing member the closing element converges towards the closest liquid outlet orifice that the closing element is matched to such that the surface of the closing element perpendicular to the liquid flow direction through the liquid outlet orifice is minimized. Thus, the thickness of the closing element extending from the closing member may reduce from a longitudinal extension, for example a symmetry plane, of the closing element towards at least one of its edges in a circumferential direction. The closing member may comprise one or more closing elements each of which may be arranged to open and close one or more liquid outlet orifices. With this solution the closing element is relatively flat such that it provides only a small surface perpendicular to the volume of liquid with negative pressure close to the liquid outlet orifice when the orifice is open. Thereby, pressure forces on the closing member forcing the closing member into a more closed position are reduced. Of course, the closing member needs to have some minimum thickness for stability reasons and consequently the term "minimized" is not to be understood in the strictest mathematical sense. The closing element may, for example, have a triangular-like cross section.

In an embodiment the closing element is a free end of the closing member. Thereby, the closing member can be relatively small which reduces the friction of the closing member when rotating on the liquid outlet member.

In an embodiment the closing element has a knife-edge-like shape. The knife-edge-like shape of the closing element provides a very small surface perpendicular to the flow direction through the liquid outlet orifice.

In an embodiment the closing member comprises at least one stop element that limits the rotation of the closing member around the liquid outlet member. This embodiment ensures that the float can only move in a predetermined angular range. This ensures that the float can, for example, not move from one housing wall to another housing wall in particular if the drain valve is manually opened. This avoids unintended damage to the drain valve. The liquid outlet member may comprise a stop surface arranged to interact with the stop element.

In an embodiment the closing member comprises at least two closing elements, and the drain valve comprises at least two liquid outlet orifices each of which is opened or closed by one of the closing elements of the closing member. The closing member can, of course, comprise one, two, three, four or more closing elements and/or the liquid outlet member may comprise one, two, three, four or more liquid outlet orifices.

In an embodiment at least two liquid outlet orifices are arranged on opposite sides of the liquid outlet member.

In an embodiment the end of the liquid outlet orifice that is first exposed when the liquid outlet orifice is opened has the smallest width perpendicular to the opening direction of the closing element. In other words, the width of the liquid outlet orifice increases at least for a fraction of the length of the liquid outlet orifice. Thereby, the pressure forces will be smaller when the closing member starts to open the liquid outlet orifice as compared to the situation when the liquid outlet orifice is already partially or completely open. Thereby, the drain valve will be able to open at higher pressure differences in the refrigeration system.

In an embodiment the at least one liquid outlet orifice is arranged in the cylinder barrel of the cylinder-like section. For example, two liquid outlet orifices can be arranged on opposite sides of the cylinder barrel of the cylinder-like section.

In an embodiment the housing comprises a common connector part through which the fluid inlet, the gas outlet, and at least one liquid outlet connected to the at least one liquid outlet orifice are led. With this solution the overall size of the drain valve may be reduced.

In an embodiment the closing member comprises an engagement surface arranged on a side of the closing member opposite to the lever. Such an engagement surface allows to rotate the closing element by a means other than the float, i.e. by engaging the engagement surface to rotate the closing element and thereby opening the liquid outlet orifice.

In an embodiment the drain valve comprises a manual opening mechanism that is structured and arranged to be operated from an outside of the valve housing to engage the engagement surface and thereby force the drain valve into a more open position of the liquid outlet orifice. The manual opening mechanism can to this end comprise an engagement element for engaging the closing member, for example, at the engagement surface. The manual opening mechanism may furthermore comprise a torque element for applying a torque to rotate the manual opening mechanism. The torque element may comprise a tool geometry adapted for receiving a tool from the outside of the housing.

The above task is also solved by a valve arrangement comprising a valve module and a drain valve according to any of the above embodiments, wherein the drain valve is connected to the valve module via the fluid inlet, the gas outlet and the liquid outlet. The valve module may, for example, allow to connect several elements of the refrigeration system in a compact way. The drain valve may be connected to the valve module by all of its fluid lines, i.e. all fluid inlets, all gas outlets and all liquid outlets in case there are more than one of each.

In an embodiment the valve module comprises at least two functional spaces, wherein the gas outlet and the liquid outlet are connected to a first functional space and the fluid inlet is connected to a second functional space.

In an embodiment the drain valve is bottom mounted to the valve module such that when a liquid is present in the float chamber the liquid will collect on the lower side of the float chamber opposite to the valve module. This embodiment allows a compact assembly of the valve arrangement in the refrigeration system.

In a second aspect the invention relates to a manual opening mechanism for a drain valve comprising a stem, an engagement element for engaging a closing member of a drain valve and a torque element for applying a torque to rotate the manual opening mechanism, wherein the engagement element is arranged at a first end of the stem and the torque element is arranged on a second end of the stem opposite to the first end of the stem.

For drain valves it is desirable to have a manual opening mechanism to allow maintenance of the drain valve and of the possibly connected evaporators of the refrigeration system which the drain valve is part of. Furthermore, the manual opening mechanism should not interfere with the normal operation of the drain valve.

According to the present invention the above task is solved in that the engagement element is arranged radially off-center relative to the rotational axis of the manual opening mechanism. Thereby, a rotation of the manual opening mechanism allows the engagement element to engage a closing member of a drain valve to open the drain valve irrespective of the level of liquid inside the drain valve.

In an embodiment the engagement element is a protrusion running parallel to the rotational axis of the manual opening mechanism.

In an embodiment the torque element is arranged on an axial face of the second end of the stem. This has the advantage that the torque element does not need to protrude out of the housing of the drain valve but the manual opening mechanism can be arranged flush with the housing of the drain valve. This reduces overall proportions of the drain valve including a manual opening mechanism according to the invention.

In an embodiment the torque element is a tool geometry that is adapted for receiving a tool. Thereby, unwanted tampering with the drain valve can be avoided which may otherwise be possible if the torque element is, for example, a simple lever protruding out of the drain valve housing.

In an embodiment the manual opening mechanism comprises at least one angular seal arranged around the stem.

The above task is furthermore solved by a drain valve comprising a housing, a fluid inlet, a gas outlet, at least one liquid outlet orifice arranged in a liquid outlet member of the housing, a float and a lever connected at a first end to the float, wherein the float is arranged in a float chamber of the housing, and wherein the float chamber is connected to the fluid inlet, the gas outlet, and the at least one liquid outlet orifice, and wherein the liquid outlet may be opened or closed by a closing member that is connected to a second end of the lever and is rotatably connected to the liquid outlet member, wherein if a liquid is arranged in the float chamber a rise in the liquid level will result in a lift of the float whereby the closing member is rotated to a more open position of the at least one liquid outlet orifice and vice versa, wherein the drain valve comprises a manual opening mechanism according to any of the above embodiments.

In an embodiment the closing member converges towards a closing element that is closest to the at least one liquid outlet orifice such that the surface of the closing member perpendicular to the liquid flow direction through the liquid outlet orifice is minimized. Thus, the thickness of the closing element extending from the closing member may reduce from a longitudinal extension, for example a symmetry plane, of the closing element towards at least one of its edges in a circumferential direction. This solution allows the closing element to be relatively flat such that it provides only a small surface perpendicular to the volume of negative pressure close to the liquid outlet orifice when the orifice is open. Thereby, pressure forces on the closing member are reduced.

In an embodiment the closing element is a free end of the closing member. Thereby, the closing member can be relatively small which reduces the friction of the closing member when rotated on the liquid outlet member.

In an embodiment the closing member comprises at least one stop element that limits the rotation of the closing member around the liquid outlet member. This embodiment ensures that the float cannot move from housing wall to housing wall in particular if the drain valve is manually opened by the manual opening mechanism. This avoids unintended damage to the drain valve, for example, if the manual opening mechanism is quickly opened. The liquid outlet member may comprise a stop surface arranged to interact with the stop element.

In an embodiment the liquid outlet member comprises a cylinder-like section and the closing member is arranged concentrically around the cylinder-like section.

In an embodiment the at least one liquid outlet orifice is arranged in the cylinder barrel of the cylinder-like section.

In a further embodiment the closing member comprises an engagement surface arranged on a side of the closing member opposite to the lever. Thereby, the manual opening mechanism may directly engage the closing member on the engagement surface to allow a manual opening of the drain valve. Thereby, it is avoided that the manual opening mechanism interacts with the lever of the drain valve which may otherwise in some cases result in a mechanical blocking of the drain valve in an open position.

In an embodiment the engagement surface is structured and arranged such that by a rotation of the manual opening mechanism engagement element engages the engagement surface whereby the closing element is rotated into a more open position of the liquid outlet orifice. To this end, both the engagement element and the engagement surface may be rounded such that the engagement element may slide over the engagement surface while the manual opening mechanism is rotated.

The above task is furthermore solved by a valve arrangement comprising a valve module and a drain valve according to any of the above embodiments, wherein the drain valve is connected to the valve module via the fluid inlet, the gas outlet and the liquid outlet, and wherein the valve module comprises at least two functional spaces, wherein the gas outlet and the liquid outlet are connected to a first functional space and the fluid inlet is connected to a second functional space.

In an embodiment the drain valve is bottom mounted to the valve module such that when a liquid is present in the float chamber the liquid will collect on the lower side of the float chamber opposite to the valve module.

According to the present disclosure, a valve arrangement comprises a valve module and a drain valve connectable to the valve module. The valve module includes first and second functional spaces, and an attachment interface defining a passage into one of the first or second functional spaces.

The drain valve includes a fluid inlet and a fluid outlet formed through a common connector part, the common connector part being connectable to the attachment interface to attach the drain valve to the valve module. The fluid inlet of the drain valve connects to the second functional space and the at least one fluid outlet connects to the first functional space when the common connector part is connected to the attachment interface.

The valve module may comprise a housing having an inlet, an outlet, and a flow path between the inlet and the outlet, the flow path including the first and second functional spaces. The flow path may comprise a plurality of serially arranged functional spaces, the plurality of serially arranged functional spaces including the first and second functional spaces. Each functional space of the plurality of serially arranged functional spaces may include an attachment interface defining a passage into the functional space. At least one functional space of the plurality of serially arranged functional spaces other than the functional space having the attachment interface to which the drain valve is attached may include a functional element. The functional element may be attached to the attachment interface of the at least one functional space. The valve module may include a valve seat and the functional element may be a valve comprising a valve body configured to engage the valve seat. The functional element may be a shut off module, a strainer module, a solenoid module, a check valve module, or a pressure control module.

According to the present disclosure, the common connector part may be connectable to the attachment interface in a variety of angular orientations to position the drain valve in any one of multiple angular orientations relative to the valve module, with the fluid inlet of the drain valve connecting to the second functional space in each of the angular orientations and the at least one fluid outlet connecting to the first functional space in each of the angular orientations. For instance, the common connector part may be connectable to the attachment interface in at least two different orientations to position the drain valve in at least two different orientations relative to the valve module, in which case, the fluid inlet of the drain valve connects to the second functional space in each of the at least two different orientations and the at least one fluid outlet connects to the first functional space in each of the at least two different orientations.

According to the present disclosure, one of the fluid inlet or the fluid outlet opens at an axial center of an end face of the common connector part and the other of the fluid inlet or the fluid outlet opens on the end face at a radial distance from the one of the fluid inlet or the fluid outlet at the axial center.

The end face of the drain valve may connect directly to the attachment interface of the valve module.

The fluid inlet may open at the axial center of the end face of the common connector part and the fluid outlet may open on the end face at the radial distance from the fluid inlet. The fluid outlet may include at least one gas outlet and at least one liquid outlet, the at least one gas outlet and the at least one liquid outlet each opening on the end face at a radial distance from the fluid inlet. The at least one liquid outlet may comprise a plurality of liquid outlets. Each liquid outlet of the plurality of liquid outlets opens on the end face at the radial distance from the fluid inlet.

An inlet connector may be positioned within the first functional space to fluidly connect the fluid inlet of the drain valve to the second functional space of the valve module.

According to the present disclosure, the at least two different orientations may include a first orientation and a second orientation in which the drain valve is rotated 180 degrees relative to the first orientation about an axis of the common connector part. The at least two different orientations may further include a third orientation in which the drain valve is rotated 90 degrees relative to the first orientation about an axis of the common connector part. Each of the common connector part and the attachment interface may include a fastening holes arranged in a circle pattern for securing the common connector part to the attachment interface. The circle pattern of the fastening holes and the fluid inlet of the drain valve may be concentric. Each of the common connector part and the attachment interface may include four equally spaced fastening holes, and the at least two different orientations may include four orientations arranged at 90 degree increments relative to one another about an axis of the common connector part.

According to the present disclosure, the valve arrangement may comprise an inlet connector connecting the fluid inlet of the drain valve to the second functional space. The inlet connector may extend through the first functional space. The first functional space may be a ring-shaped chamber formed about the inlet connector.

BRIEF DESCRIPTION OF THE DRAWINGS

Embodiments of the invention will now be described with reference to the figures, wherein.

DETAILED DESCRIPTION

Figure 1:
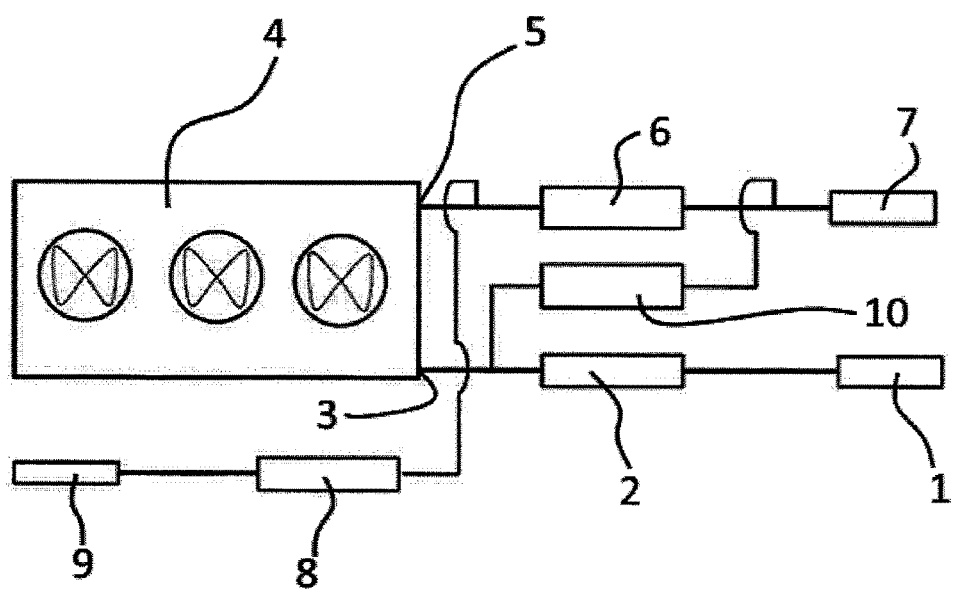
FIG. 1 shows a schematic depiction of a part of a refrigeration system comprising a drain valve according to the invention.

FIG. 1 shows a schematic diagram of a part of a refrigeration system using a drain valve according to the invention. During normal operation of the refrigeration system, the refrigerant is flowing from a pump separator liquid line 1 through a feed valve assembly 2 and an inlet 3 to an evaporator 4. The refrigerant is then evaporated in the evaporator 4 whereby heat is removed from the surrounding air. The refrigerant leaves the evaporator 4 through an outlet 5 and further passes through a return valve assembly 6 to a pump separator 7.

When the evaporator 4 is to be defrosted the feed valve assembly 2 is closed and afterwards the return valve assembly 6 is closed. Furthermore, an injection valve assembly 8 is opened allowing the hot gas refrigerant from a compressor 9 to enter into the evaporator 4 through the outlet 5 (i.e. in the opposite direction of normal operation). In the evaporator 5 the hot gas refrigerant serves to heat up the evaporator such that the accumulated ice on the outside of evaporator 4 is melted. A mixture of liquid and gaseous refrigerant leaves the evaporator 4 through the inlet 3 into a drain valve 10. The drain valve 10 allows to control the flow back of the refrigerant into the low pressure side of the refrigeration system. In particular, it prevents large amounts of hot gas refrigerant to enter the pump separator 7 by controlling the flow of refrigerant from the evaporator 4. In the drain valve 10 liquid refrigerant collects until a liquid level necessary to open the drain valve 10 is reached. The drain valve 10 thereby is utilized for a controlled emptying of the evaporator 4 before and during a defrosting of the evaporator 4.

Figure 2:
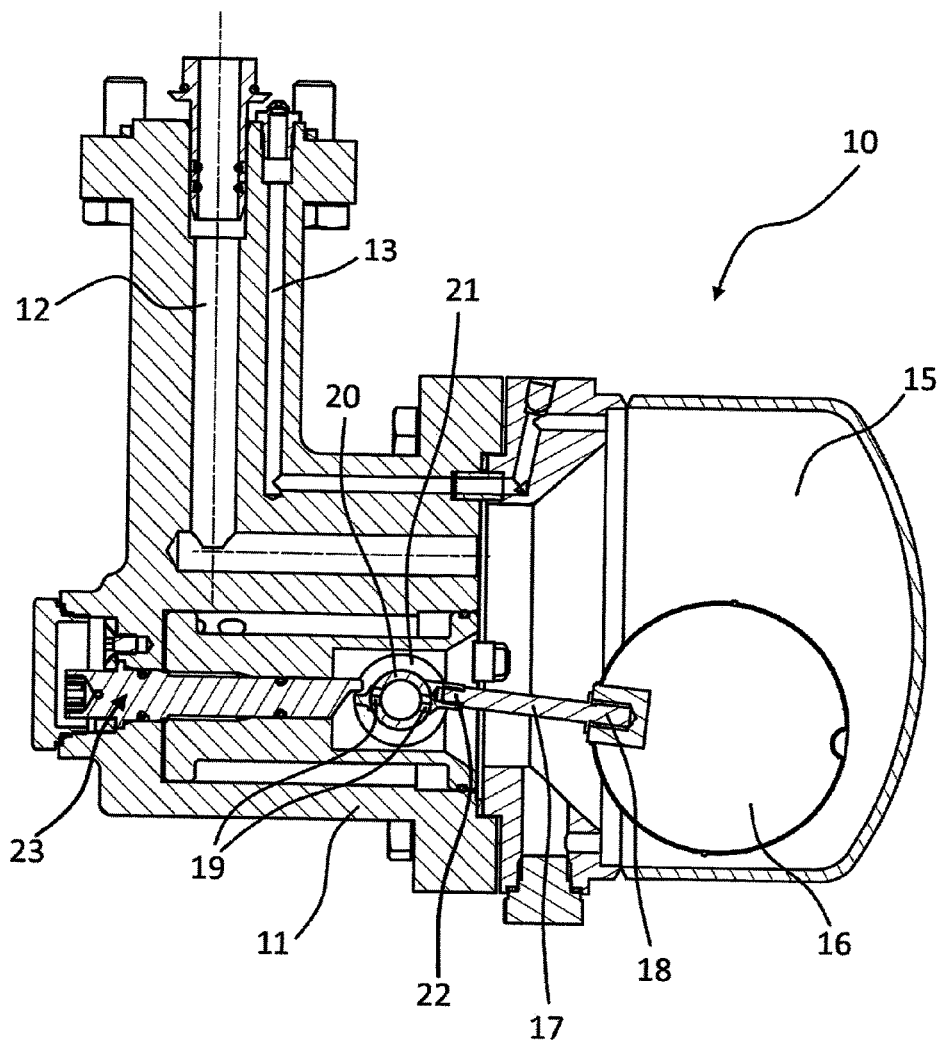
FIG. 2 shows a cut view through a drain valve according to the invention, FIG. 3A+3B show a part of the opening and closing mechanism of the drain valve according to the invention in the closed position, FIG. 4A+4B show parts of the opening and closing mechanism of the drain valve according to the invention in the open position of the drain valve, FIG. 5A+5B show a closing member according to the invention from two different perspectives.

FIG. 2 shows a cut view of a drain valve 10 according to the invention. The drain valve 10 comprises housing 11. In the housing 11 a fluid inlet 12 as well as a gas outlet 13 are arranged. Furthermore, the drain valve 10 comprises at least one liquid outlet 14 which is not visible in this cut view. This embodiment comprises four liquid outlets 14.

The drain valve 10 furthermore comprises a float chamber 15 in which a float 16 is moveably arranged. A lever 17 is connected at a first end 18 to the float 16. The float chamber 15 is connected to the fluid inlet 12, the gas outlet 13 and at least one liquid outlet orifice 19. In this embodiment the drain valve 10 comprises two liquid outlet orifices 19. The liquid outlet orifices 19 are arranged in a liquid outlet member 20 of the housing 11. The liquid outlet orifices 19 are opened and closed by a closing member 21. The closing member 21 is connected to a second end 22 of the lever 17.

When the liquid level inside the float chamber 15 arises the buoyancy of the float 16 will cause the float 16 to rise inside the float chamber 15. Thereby, the closing member 21 is rotated around the liquid outlet member 20 causing the liquid outlet orifices 19 to be opened. Thereby, liquid refrigerant from the float chamber 15 can flow out of the drain valve 10 through the liquid outlets 14.

FIG. 2 furthermore shows a manual opening mechanism 23 according to the invention. This will be explained in further detail in particular with reference to FIGS. 8 and 9.

Figure 3A:
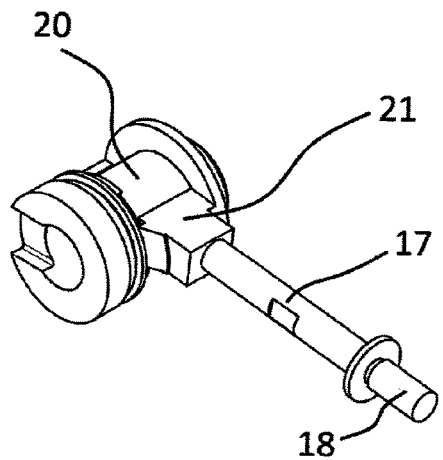
Figure 3B:
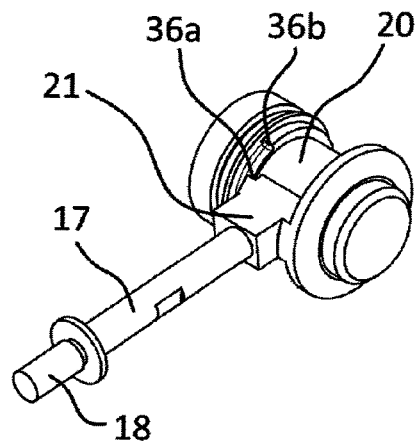

FIGS. 3A, 3B, 4A and 4B show parts of the opening and closing mechanism of the drain valve 10 according to the invention. In FIGS. 3A and 3B the closing member 21 is in a fully closed position while in FIGS. 4A and 4B the closing member 21 is in a fully open position. In FIGS. 3A and 3B the lever 17 is in a lowered position such that the closing member 21 closes the liquid outlet orifices 19. A stop element 36a is arranged at the closing member 21. A stop surface 36b is arranged at the liquid outlet member 20. In the fully closed position, the stop element 36a is distant from the stop surface 36b. In the fully open position, the stop element 36a interacts with the stop surface 36b, limiting rotation of the closing member 21 around the liquid outlet member 20.

Figure 4A:
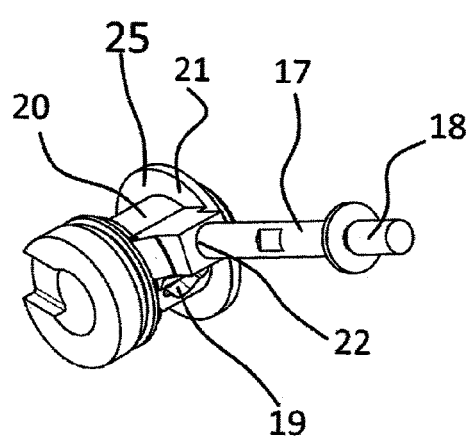
Figure 4B:
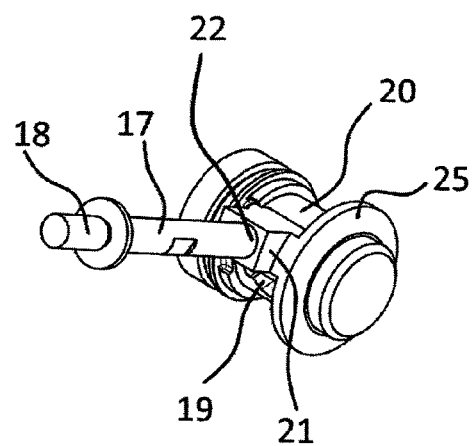

In FIGS. 4A and 4B the lever 17 is in a raised position whereby the closing member 21 has been rotated relative to the liquid outlet member 20. The liquid outlet orifices 19 are consequently opened and liquid refrigerant can flow from the float chamber 15 towards the liquid outlet 14.

FIGS. 5A and 5B show two different views of the closing member 21 according to the invention. The closing member 21 comprises at least one closing element 24. In this case the closing member 21 comprises two closing elements 24 one for each liquid outlet orifice 19. The closing elements 24 are connected by a closing member ring 25. The closing elements 24 here are free ends of the closing member 21. In particular, the closing elements have a knife-edge-like shape. The closing member 21 converges towards the closing elements 24. A dashed line represents a symmetry plane. From the symmetry plane towards the edges of the closing element 24, the thickness of the closing element 24 reduces in a circumferential direction of closing member ring 25. Thereby, the surface of the closing element perpendicular to the liquid flow direction through the liquid outlet orifice 19 is minimized. This reduces pressure forces caused by a negative pressure near the liquid outlet orifice 19 when the closing member opens the liquid outlet orifice 19. Otherwise, these pressure forces may prevent the closing member 21 from opening further even if the liquid level in the drain valve 10 rises. With this solution the drain valve 10 may be used at higher pressure differences in the refrigeration system between the low pressure and the high pressure side of the refrigeration system. Furthermore, the stop element 36a is shown.

In the given embodiment the drain valve 10 comprises two liquid outlet orifices 19 that are arranged on opposite sides of the liquid outlet member 21. However, the drain valve 10 may also comprise a different number of liquid outlet orifices 19, i.e. one, three, four, five, six or more liquid outlet orifices 19.

Figure 6:
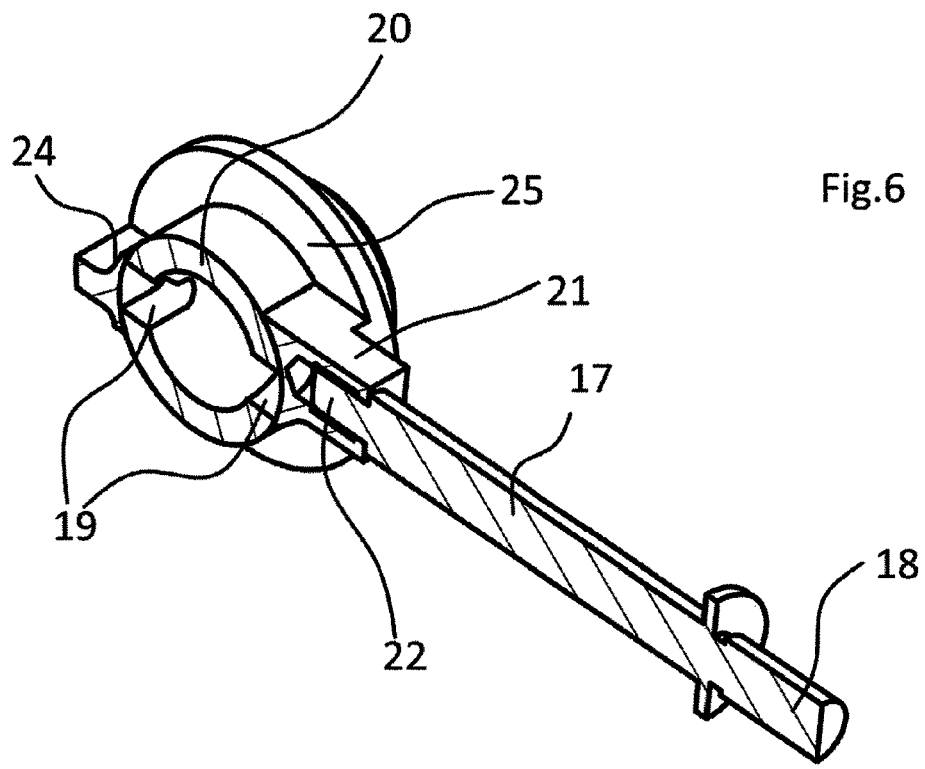
FIG. 6 shows part of the opening and closing mechanism of the drain valve in a cut view in a closed position of the drain valve.
Figure 7:
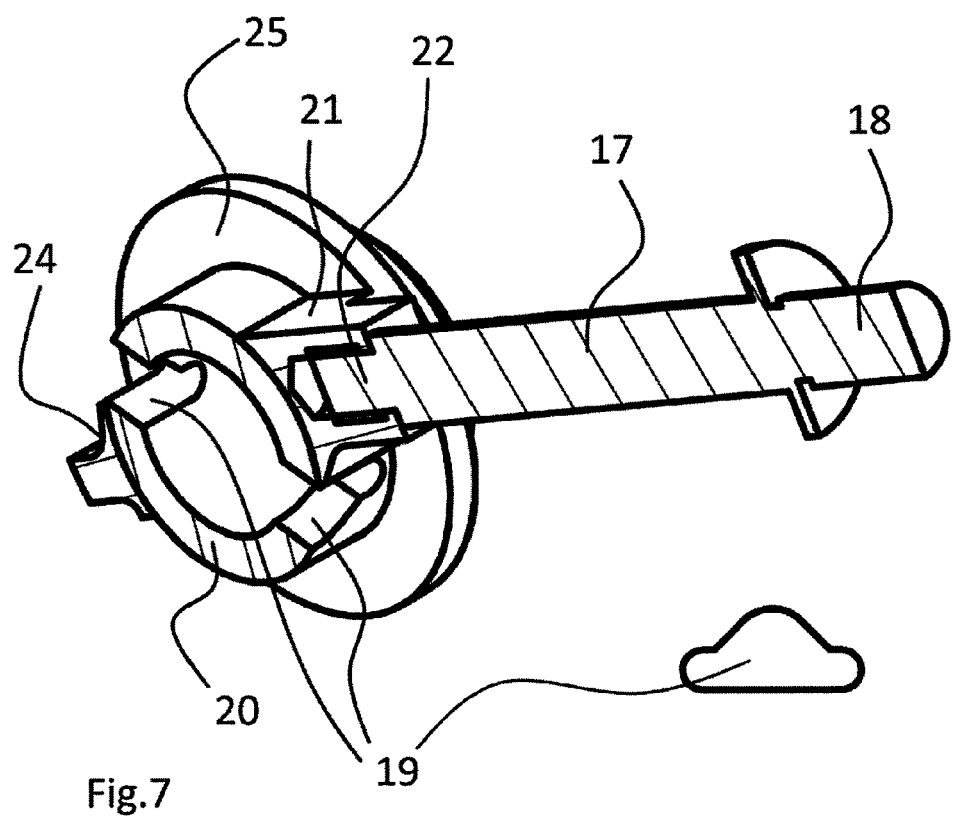
FIG. 7 shows part of the opening and closing mechanism of the drain valve in an open position of the drain valve.

FIGS. 6 and 7 show a similar situation to the previous FIGS. 3A, 3B, 4A and 4B. In this case however, a cut view of the lever 17, the closing member 21 and the liquid outlet member 20 is shown. FIG. 6 shows a fully closed position of the drain valve 10 while FIG. 7 shows a fully opened position. FIG. 7 furthermore shows the shape of the liquid orifice 19 in the lower right corner. The end of the liquid orifice 19 that is first exposed when the liquid outlet orifice 19 is opened has the smallest width (as shown this is the horizontal direction) perpendicular to the opening direction (as shown this is the vertical direction) of the closing element 24.

Figure 8:
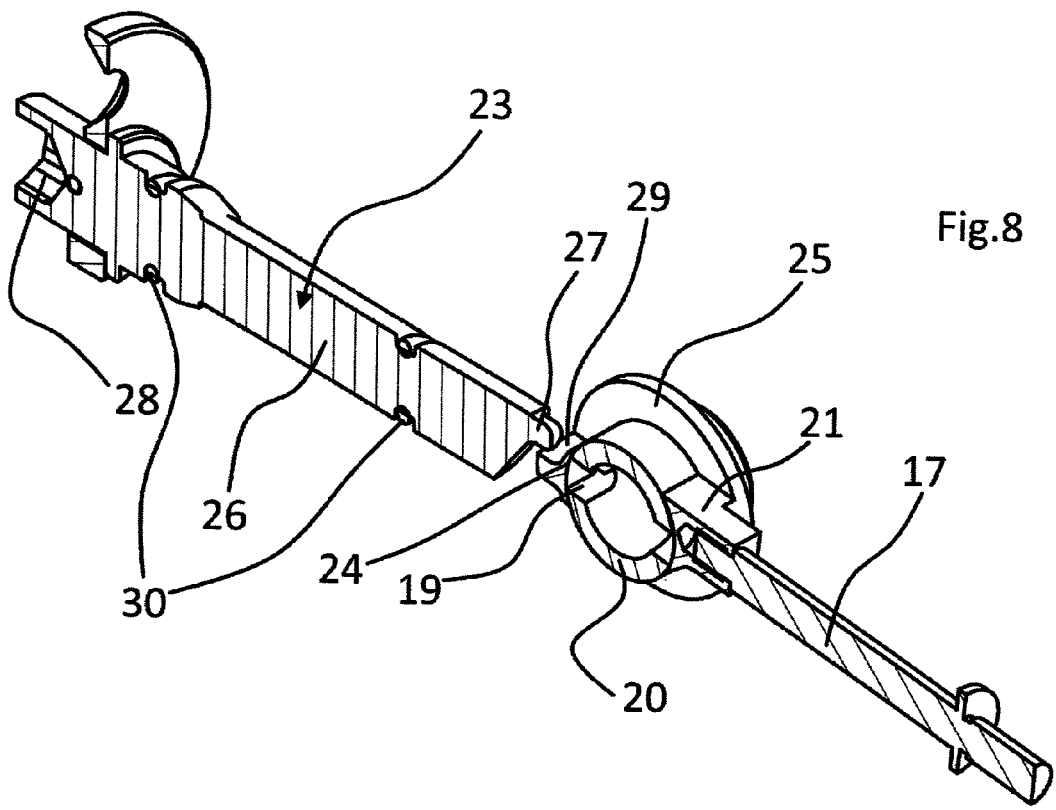
FIG. 8 shows a cut view through a manual opening mechanism as well as parts of the opening and closing mechanism of the drain valve according to the invention in a closed position of the drain valve.
Figure 9:
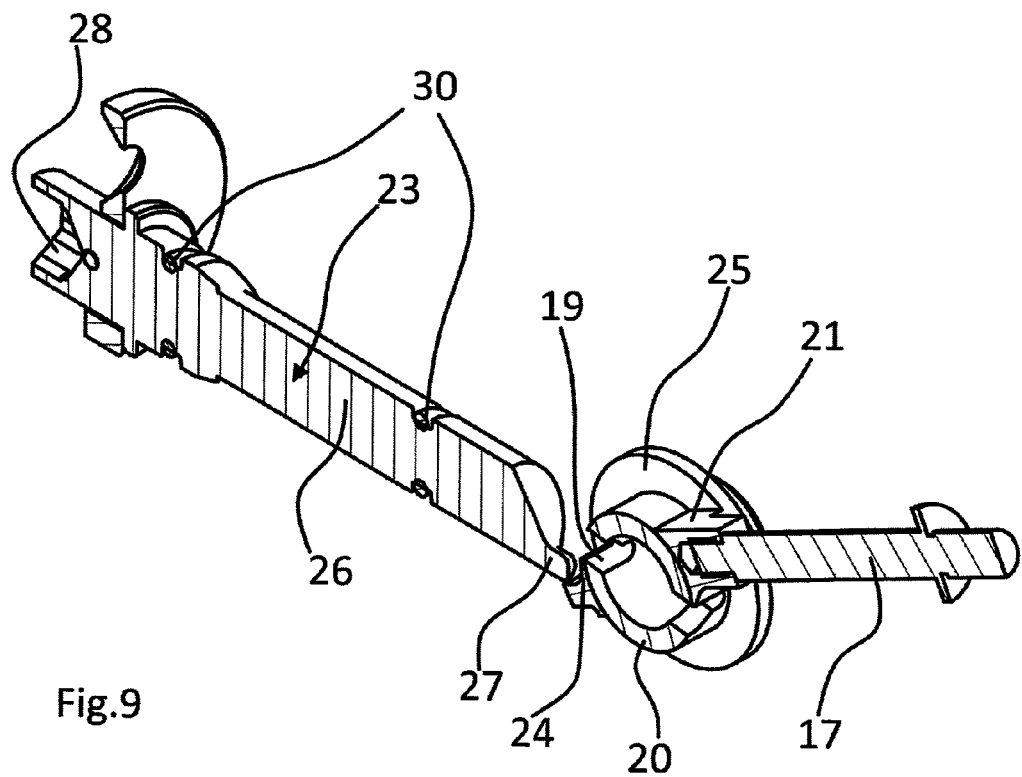
FIG. 9 shows a cut view through both the manual opening mechanism as well as part of the opening and closing mechanism of the drain valve in an open position of the drain valve.

FIGS. 8 and 9 show the interaction between the manual opening mechanism 23 according to the invention and the closing member 21, the liquid outlet member 20 and the lever 17 of the drain valve 10. FIG. 8 shows a fully closed position of the drain valve 10 while FIG. 9 shows a fully opened position.

The manual opening mechanism 23 comprises a stem 26 having an elongated shape. The manual opening mechanism 23 furthermore comprises an engagement element 27 for engaging the closing member 21. The engagement element 27 is arranged radially off-center relative to the rotational axis of the manual opening mechanism 23. The manual opening mechanism 23 furthermore comprises a torque element 28 for applying a torque to rotate the manual opening mechanism 23 from outside the housing 11. The torque element 28 is arranged on a second end of the stem 26 opposite to a first end of the stem 26 in which the engagement element 27 is arranged. The closing member 21 comprises an engagement surface 29 arranged on a side of the closing member 21 opposite to the lever 17. When the manual opening mechanism 23 is rotated the engagement element 27 engages an engagement surface 29 whereby the closing element 21 is rotated into a more open position of the liquid outlet orifice 19. This situation is shown in FIG. 9 where the liquid outlet orifice 19 is fully open.

In this embodiment the torque element 28 is arranged on an axial face on the first end of the stem 26. The torque element 28 is in this embodiment a tool geometry that is adapted for receiving a tool. Thereby, an unwanted tampering with the manual opening mechanism 23 can be avoided.

The manual opening mechanism 23 furthermore comprises two annular seals 30 arranged around the stem 26.

Figure 10:
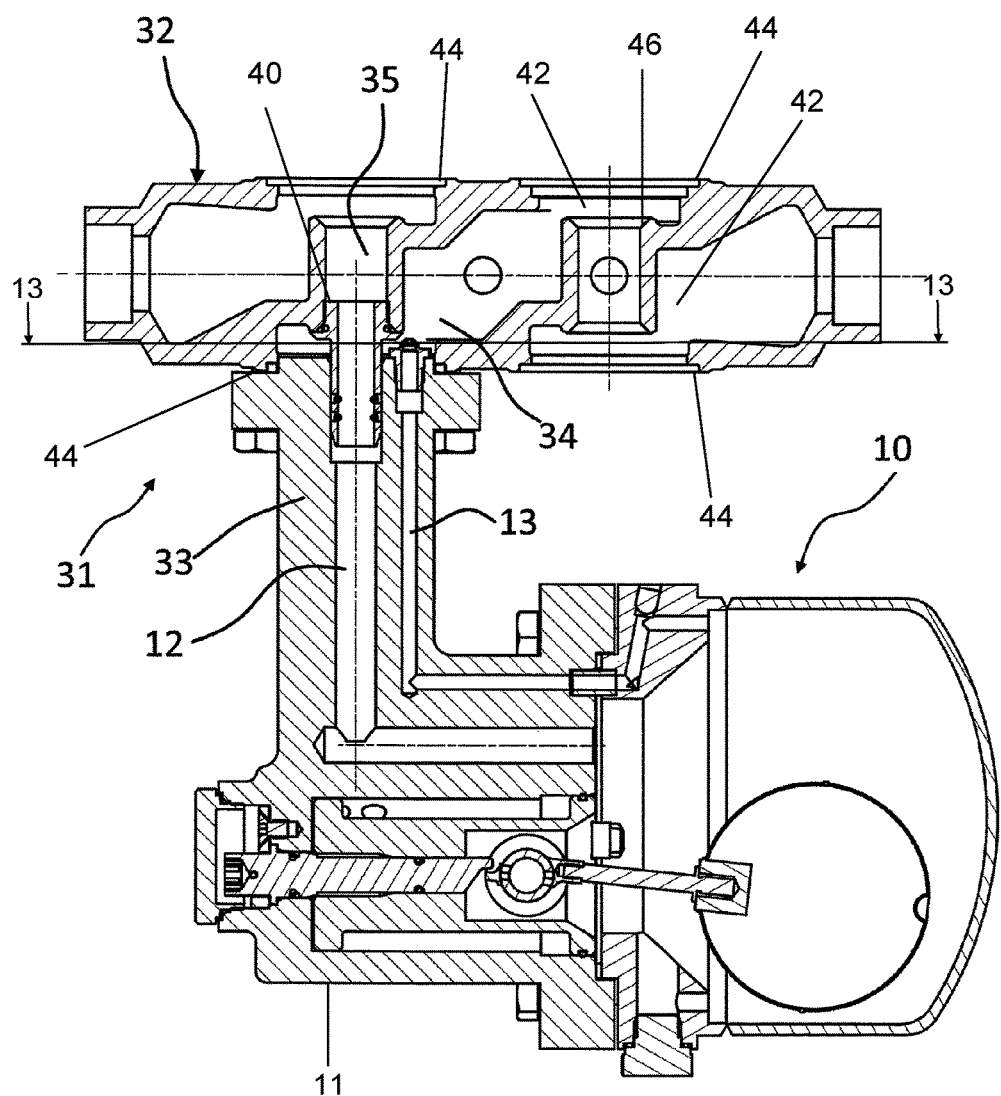
FIG. 10 shows a cut view through a valve arrangement according to the invention comprising a valve module as well as a drain valve.
Figure 11:
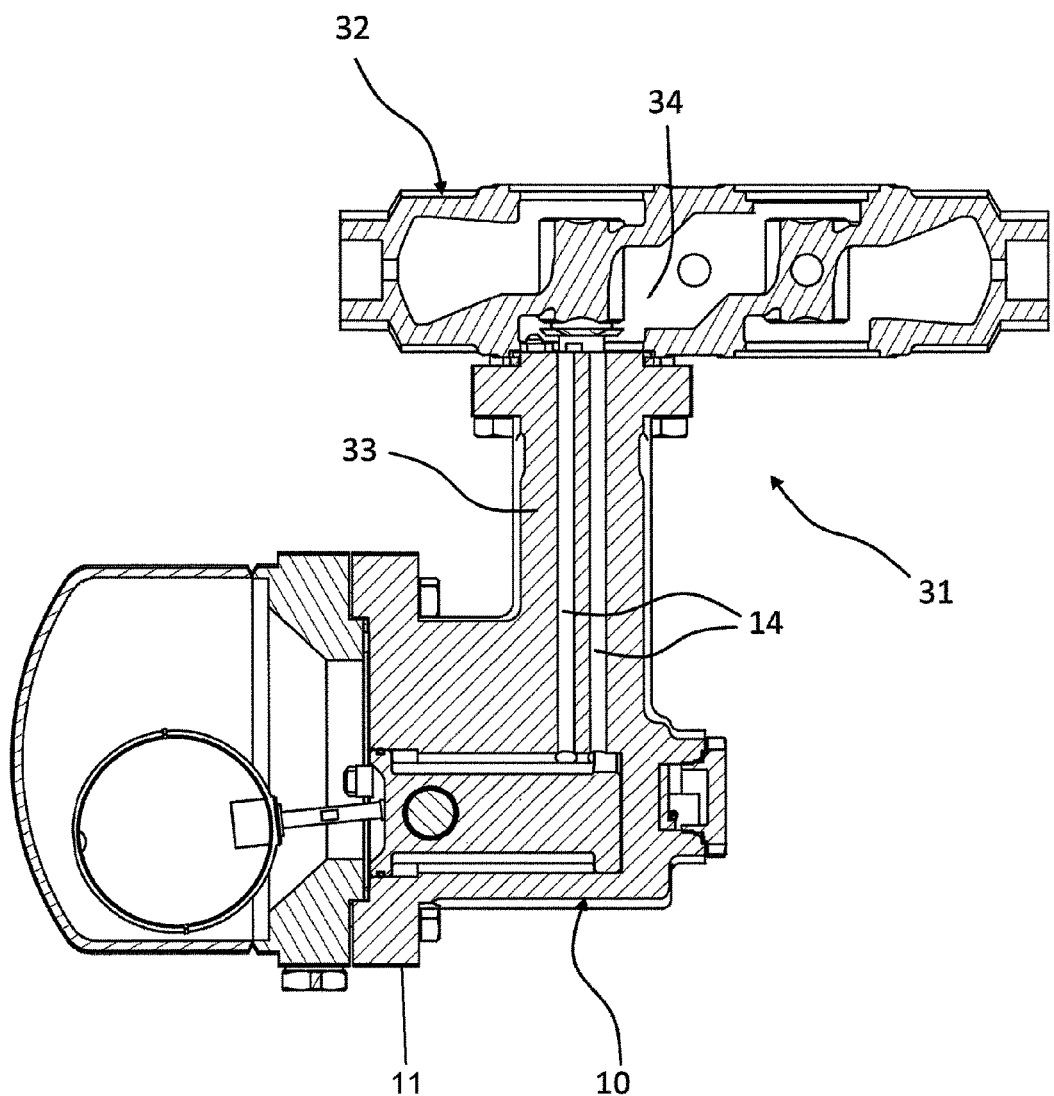
FIG. 11 shows a different cut view through a valve arrangement comprising a valve module and a drain valve according to the invention.

FIGS. 10 and 11 show an embodiment of a valve arrangement 31 according to the invention. In both figures, the same drain valve 10 is connected to a valve module 32. The difference between the arrangements according to FIGS. 10 and 11 is that the drain valve 10 is attached to the valve module 32 in a 180° rotated position relative to one another. The drain valve 10 shown in FIGS. 10 and 11 is however the same drain valve 10 as in the previous embodiments according to FIGS. 1 to 9. In FIGS. 10 and 11 the drain valve 10 is connected to the valve module 32 via the fluid inlet 12, the gas outlet 13 as well as the liquid outlets 14. The liquid outlets 14 are shown in FIG. 11 which shows a parallel cut view compared to the previous cut views through the drain valve 10 as shown in FIGS. 2 and 10.

The housing 11 here comprises a common connector part 33. Through the common connector part 33 the fluid inlet 12, the gas outlet 13 as well as the liquid outlets 14 are led. The fluid inlet 12, the gas outlet 13 as well as the liquid outlets are all connected to the valve module 32. The valve module 32 comprises several functional spaces 34, 35. The gas outlet 13 and the liquid outlets 14 are connected to a first functional space 34. The fluid inlet 12 is connected to a second functional space 35.

Figure 12:
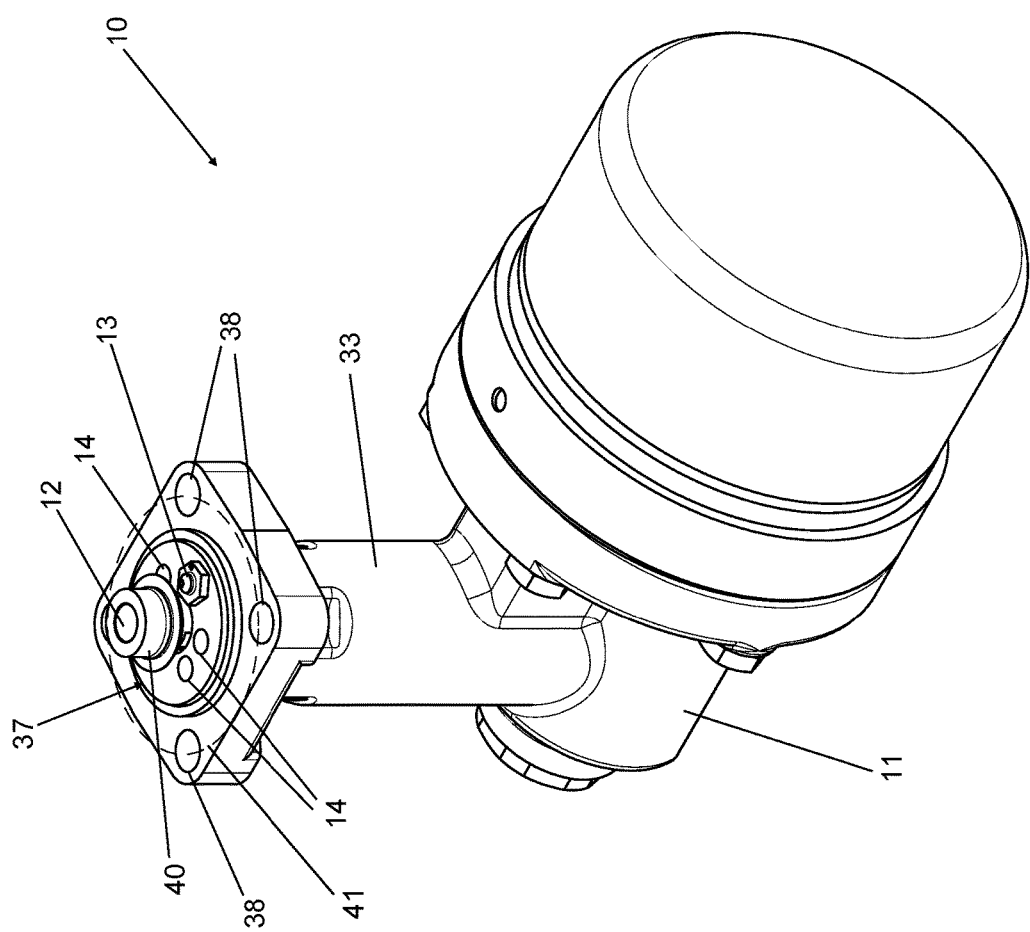
FIG. 12 shows a perspective view of the drain valve of FIG. 10.

As seen in FIG. 12, the fluid inlet 12, the gas outlet 13, and the liquid outlets 14 all open on an end face 37 of the common connector part 33. The fluid inlet 12 is positioned at the center of the end face 37 and the gas outlet 13 and liquid outlets 14 are positioned at radial distances from the fluid inlet 12. The drain valve 10 also includes mounting holes 38 positioned in a circle 41 around the perimeter of end face 37, with the fluid inlet 12 centrally located between all of the mounting holes 38.

Figure 13:
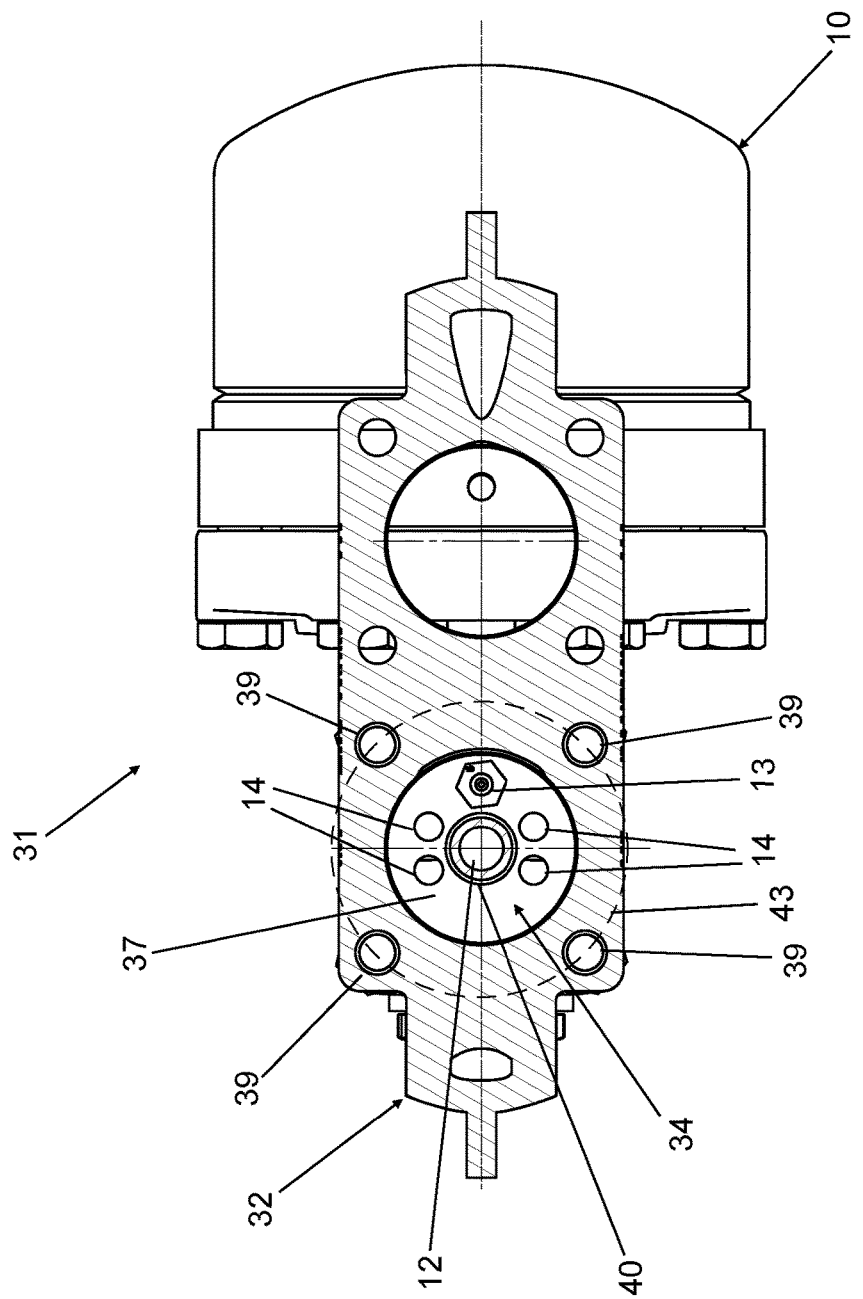
FIG. 13 shows a cut view through the valve arrangement of FIG. 10.

As seen in FIG. 13, the valve module 32, likewise, includes mounting holes 39 positioned in a circle 43 around an opening into the first functional space 34 through the bottom of the valve module 32. The circles 41 and 43 on which the mounting holes 38, 39 are positioned are the same size and the mounting holes 38, 39 are formed in a the same pattern on the respective circle 41, 43, such as the square pattern shown in FIGS. 12 and 13. The mounting holes 38, 39 allow the drain valve 10 to be attached to the valve module 32 by bolts as shown in FIGS. 10 and 11. An opening from the first functional space 34 to the second functional space 35 is formed centrally between the mounting holes 39 so that, as seen in FIG. 10, when the drain valve 10 is attached to the valve module 32, the fluid inlet 12 connects to the second functional space 35 through an inlet connector 40.

As seen in FIG. 13, when the drain valve 10 is attached to the valve module 32, the gas outlet 13 and liquid outlets 14 all open into a ring chamber of the first functional space 34 formed about the inlet connector 40. Due to the patterns of the mounting holes 38, 39 about circles 41, 43, respectively, the positioning of the opening between the first and second functional spaces 34, 35, the positioning of the fluid inlet 12 at the center of the end face 37, and the positioning of the gas outlet 13 and liquid outlets 14 at radial distances from the fluid inlet, the drain valve 10 may be attached to the valve module 32 in a variety of configurations with the fluid inlet 12 always connecting to the second functional space 35 through the inlet connector 40 and the gas outlet 13 and liquid outlets 14 always opening into the ring chamber of the first functional space 34 formed about the connector 40. For example, with the square mounting bolt pattern shown in FIGS. 12 and 13, the drain valve 10 may be attached to the valve module 32 as shown in FIG. 10, at the 180° rotated position shown in FIG. 11, or at a 90° rotated position halfway between the position shown in FIG. 10 and the position shown in FIG. 11, with the body of the drain valve 10 being perpendicular to the axial direction of the valve module 32. Although the exemplary valve arrangement 31 has been described in connection with four mounting hole arranged in a square pattern, the number of mounting holes 38, 39 and their respective spacing on circles 41, 43 may be increased or decreased to provide a different number of mounting configurations. For example, eight mounting holes 38, 39 may be equally spaced about each circle 41, 43 to provide for eight different mounting positions of the drain valve 10 at 45-degree increments. Additionally, the flanges through with the mounting holes 38, 39 are formed may be round instead of the square flanges shown to accommodate additional mounting holes 38, 39.

Although the drain valve 10 is shown as having multiple outlets, including the gas outlet 13 and the liquid outlets 14, the drain valve 10 could, instead, combine the gas and liquid flows within the drain valve and include only a single outlet into the first functional space 34. For such a drain valve, the single outlet could be centrally located between the mounting holes 38 at the center of the end face 37 and the fluid inlet 12 could be located at a radial distance from the single outlet such that the fluid inlet 12 is positioned to open into the ring chamber of the first functional space 34 and the single outlet connects to the second functional space 35 through connector 40. The drain valve could, thus, be attached to the valve module 32 in the same variety of configurations with the single fluid outlet always connecting to the second functional space 35 through the connector 40 and the fluid inlet always opening into the ring chamber of the first functional space 34 formed about the connector 40.

Additionally, although the valve arrangement 31 has been described in connection with the drain valve 10, the valve arrangement 31 could instead include some other similar drain valve connected to the valve module 32, where the other similar drain valve would only need to include the common connector part 33, through which the fluid inlet 12, the gas outlet 13, and the liquid outlets 14 are led to end face 37 so as to interface with the first and second functional spaces, 34, 35 in substantially the same manner discussed above.

The drain valve 10 is bottom mounted to the valve module 32 such that when a liquid is present in the float chamber 15 the liquid will collect on the lower side of the flow chamber 15 opposite to the valve module 32.

As seen in FIG. 10, the valve module 32 may include additional functional spaces 42 serially arranged with the first and second functional spaces 34, 35 between an inlet and an outlet of the valve module 32. These additional functional spaces 42, along with the first and second functional spaces 34, 35, form a flow path between the inlet and outlet of the valve module 32. Each functional space 34, 35, 42 may include an attachment interface 44 to which the drain valve 10 or some other functional element may be attached. For example, for proper operation, the drain valve 10 must be attached to the bottom of the valve module 32, but this attachment may be at any bottom port of the valve module 32.

Figure 14:
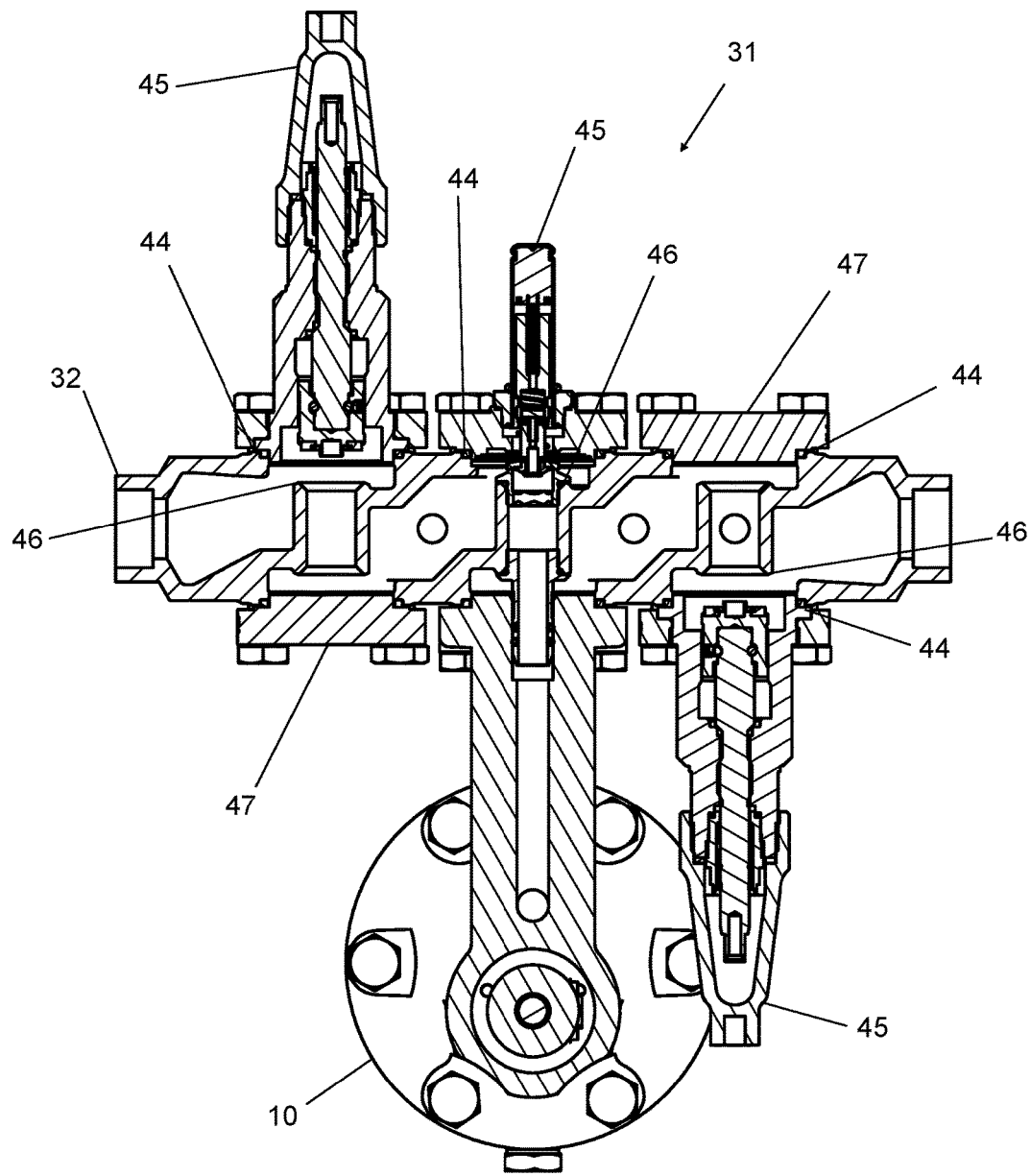
FIG. 14 shows a cut view through a valve arrangement according to the invention comprising a valve module, a drain valve, and additional functional elements.

For example, referring to FIG. 14, additional functional elements 45 are attached to the valve module 32 along with the drain valve 10 at attachment interfaces 44. These additional functional elements 45 may include shut off modules, strainer modules, solenoid modules, check valve modules, pressure control modules, or various other similar functional elements. Some of these additional functional elements 45 may include valve bodies or other moving components that interact with a valve seat 46 formed in the valve module 32 to alter fluid flow through the valve module 32. Covers 47 may also be attached to the valve module 32 at attachment interfaces 44 where functional elements are not desired to close the respective openings at the attachment interfaces 44.

An aspect of the invention may be defined using the following clauses:

1. A manual opening mechanism for a drain valve 10 comprising a stem 26, an engagement element 27 for engaging a closing member 21 of a drain valve 10 and a torque element 28 for applying a torque to rotate the manual opening mechanism 23, wherein the engagement element 27 is arranged at a first end of the stem 26 and the torque element 28 is arranged on a second end of the stem 26 opposite to the first end of the stem 26, characterized in that the engagement element 27 is arranged radially off-center relative to the rotational axis of the manual opening mechanism 23.

2. The manual opening mechanism according to clause 1, characterized in that the engagement element 27 is a protrusion running parallel to the rotational axis of the manual opening mechanism 23.

3. The manual opening mechanism according to clause 1 or 2, characterized in that the torque element 28 is arranged on an axial face on the second end of the stem 26.

4. The manual opening mechanism according to any of clauses 1 to 3, characterized in that the torque element 28 is a tool geometry that is adapted for receiving a tool.

5. The manual opening mechanism according to any of clauses 1 to 4, characterized in that the manual opening mechanism 23 comprises at least one annular seal 30 arranged around the stem 26.

6. A drain valve comprising a housing 11, a fluid inlet 12, a gas outlet 13, at least one liquid outlet orifice 19 arranged in a liquid outlet member 20 of the housing 11, a float 16 and a lever 17 connected at a first end 18 to the float 16, wherein the float 16 is arranged in a float chamber 15 of the housing 11, and wherein the float chamber 15 is connected to the fluid inlet 12, the gas outlet 13 and the at least one liquid outlet orifice 19, and wherein the liquid outlet orifice 19 may be opened or closed by a closing member 21 that is connected to second end 22 of the lever 17 that is rotatably connected to the liquid outlet member 20, wherein if a liquid is arranged in the float chamber 15 a rise in the liquid level will result in a lift of the float 16 whereby the closing member 21 is rotated to a more open position of the at least one liquid outlet orifice 19 and vice versa, characterized in that the drain valve 10 comprises a manual opening mechanism 23 according to any of the clauses 1 to 5 that is arranged in the valve housing 11.
7. The drain valve according to clause 6, characterized in that the closing member 21 converges towards a closing element 24 that is closest to the at least one liquid outlet orifice 19 such that the surface of the closing element 24 perpendicular to the liquid flow direction through the liquid outlet orifice 19 is minimized.
8. The drain valve according to clause 6 or 7, characterized in that the closing element 24 is a free end of the closing member 21.
9. The drain valve according to any of clauses 6 to 8, characterized in that the closing member 21 comprises at least one stop element 36a that limits the rotation of the closing member 21 around the liquid outlet member 20.
10. The drain valve according of clauses 6 to 9, characterized in that the liquid outlet member 20 comprises a cylinder-like section and the closing member 21 is arranged concentrically around the cylinder-like section.
11. The drain valve according to clause 10, characterized in that the at least one liquid outlet orifice 19 is arranged in the cylinder barrel of the cylinder-like section.
12. The drain valve to any of clauses 6 to 11, characterized in that the closing member 21 comprises an engagement surface 29 arranged on a side of the closing member 21 opposite to the lever 17.
13. The drain valve according to clause 12, characterized in that the engagement surface 29 is structured and arranged such that by a rotation of the manual opening mechanism 23 the engagement element 27 engages the engagement surface 29 whereby the closing element 21 is rotated to a more open position of the liquid outlet orifice 19.
14. A valve arrangement comprising a valve module 32 and a drain valve 10 according to any of clauses 6 to 13, wherein the drain valve 10 is connected to the valve module 32 via the fluid inlet 12, the gas outlet 13 and the liquid outlet 14, and wherein the valve module 32 comprises at least two functional spaces 34, 35, and wherein the gas outlet 13 and the liquid outlet 14 are connected to a first functional space 34 and the fluid inlet 12 is connected to a second functional space 35.
15. The valve arrangement according to clause 14, wherein the drain valve 10 is bottom mounted to the valve module 32 such that when a liquid is present in the float chamber 15 the liquid will collect on the lower side of the float chamber 15 opposite to the valve module 32.

Accordingly the present disclosure provides a drain valve comprising a housing, a fluid inlet, a gas outlet, at least one liquid outlet orifice arranged in a liquid outlet member of the housing, a float and a lever connected at a first end to the float, wherein the float is arranged in a float chamber of the housing, and wherein the float chamber is connected to the fluid inlet, the gas outlet and the at least one liquid outlet orifice, and wherein the liquid outlet orifice may be opened or closed by a closing member that is connected to a second end of the lever and is rotatably connected to the liquid outlet member, wherein if a liquid is arranged in the float chamber a rise in the liquid level will result in a lift of the float, whereby the closing member is rotated to a more open position of the at least one liquid outlet orifice and vice versa.

The present disclosure also provides a valve arrangement comprising a valve module and a drain valve, wherein the drain valve is attachable to the valve module in multiple positions or configurations.

While the principles of the present disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:
1. A valve arrangement comprising:
   a valve module including first and second functional spaces, and an attachment interface defining a passage into one of the first or second functional spaces; and
   a drain valve including a fluid inlet and a fluid outlet formed through a common connector part, the common connector part being connectable to the attachment interface to attach the drain valve to the valve module;
   wherein the fluid inlet of the drain valve is fluidly connected to the second functional space and the at least one fluid outlet is fluidly connected to the first functional space when the common connector part is connected to the attachment interface;
   wherein the common connector part is connectable to the attachment interface in at least two different orientations to position the drain valve in at least two different orientations relative to the valve module; and
   wherein the fluid inlet of the drain valve connects to the second functional space in each of the at least two different orientations and the at least one fluid outlet connects to the first functional space in each of the at least two different orientations.
2. The valve arrangement according to claim 1, wherein one of the fluid inlet or the fluid outlet opens at an axial center of an end face of the common connector part and the other of the fluid inlet or the fluid outlet opens on the end face at a radial distance from the one of the fluid inlet or the fluid outlet at the axial center.
3. The valve arrangement according to claim 1, wherein the fluid inlet opens at an axial center of an end face of the common connector part and the fluid outlet opens on the end face at a radial distance from the fluid inlet.
4. The valve arrangement according to claim 3, further comprising an inlet connector positioned within the first functional space and fluidly connecting the fluid inlet of the drain valve to the second functional space of the valve module.
5. The valve arrangement according to claim 3, wherein the fluid outlet includes at least one gas outlet and at least one liquid outlet, the at least one gas outlet and the at least one liquid outlet each opening on the end face at a radial distance from the fluid inlet.

6. The valve arrangement according to claim 5, wherein the at least one liquid outlet comprises a plurality of liquid outlets, each liquid outlet of the plurality opening on the end face at the radial distance from the fluid inlet.

7. The valve module according to claim 1, wherein each of the common connector part and the attachment interface includes fastening holes arranged in a circle pattern for securing the common connector part to the attachment interface.

8. The valve module according to claim 7, wherein the circle pattern of the fastening holes and the fluid inlet of the drain valve are concentric.

9. The valve module according to claim 7, wherein each of the common connector part and the attachment interface includes four equally spaced fastening holes; and wherein the at least two different orientations includes four orientations arranged at 90 degree increments relative to one another about an axis of the common connector part.

10. The valve arrangement according to claim 7, further comprising an inlet connector connecting the fluid inlet of the drain valve to the second functional space.

11. The valve arrangement according to claim 10, wherein the inlet connector extends through the first functional space.

12. The valve arrangement according to claim 11, wherein the first functional space is a ring-shaped chamber formed about the inlet connector.

13. The valve arrangement according to claim 1, wherein the valve module comprises a housing having an inlet, an outlet, and a flow path between the inlet and the outlet, the flow path including the first and second functional spaces.

14. The valve arrangement according to claim 13, wherein the flow path comprises a plurality of serially arranged functional spaces, the plurality of serially arranged functional spaces including at least the first and second functional spaces.

15. The valve arrangement according to claim 14, wherein each functional space of the plurality of serially arranged functional spaces includes a separate attachment interface defining a passage into the functional space, one of the separate attachment interfaces being the attachment interface defining a passage into one of the first or second functional spaces.

16. The valve arrangement according to claim 15, wherein at least one functional space of the plurality of serially arranged functional spaces other than the functional space having the attachment interface to which the drain valve is attached includes a functional element.

17. The valve arrangement according to claim 16, wherein the functional element is a shut off module, a strainer module, a solenoid module, a check valve module, or a pressure control module.

18. The valve arrangement according to claim 16, wherein the functional element is attached to the attachment interface of the at least one functional space.

19. The valve arrangement according to claim 18, wherein the valve module includes a valve seat and the functional element is a valve comprising a valve body configured to engage the valve seat.

\* \* \* \* \*